(12) United States Patent
Ishida et al.

(10) Patent No.: US 6,536,837 B2
(45) Date of Patent: Mar. 25, 2003

(54) JOINT STRUCTURE OF CAB MOUNTING PORTION

(75) Inventors: Youichi Ishida, Kanagawa (JP); Masakatsu Takagi, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/870,049

(22) Filed: May 30, 2001

(65) Prior Publication Data

US 2002/0021026 A1 Feb. 21, 2002

(30) Foreign Application Priority Data

May 31, 2000 (JP) ........................................ 2000-161581

(51) Int. Cl.[7] .............................................. B62D 25/20
(52) U.S. Cl. ............................ 296/190.08; 296/190.05; 296/194; 296/29; 180/89.14; 180/89.18
(58) Field of Search ........................ 296/190.04, 190.05, 296/190.08, 194, 204, 203.02, 188, 29, 30; 180/89.12, 89.13, 89.14, 89.17, 89.18

(56) References Cited

U.S. PATENT DOCUMENTS 6,260,912 B1 * 7/2001 Sarmiento et al. ........ 180/89.19
6,260,914 B1 * 7/2001 Nieminski et al. .......... 280/779
6,315,351 B1 * 11/2001 Sarmiento et al. ....... 180/89.19

FOREIGN PATENT DOCUMENTS

JP 56-116277 9/1981
JP 61-171653 10/1986

* cited by examiner

*Primary Examiner*—Joseph D. Pape
*Assistant Examiner*—Patricia L. Engle
(74) *Attorney, Agent, or Firm*—Morrison & Foerster LLP (57) ABSTRACT

There is provided a cab structure that a joint portion of a cab and a chassis frame has sufficient shear strength and which can disperse external force to the entire cab or chassis frame to reduce the burden of load and can sufficiently resist the impact load in the longitudinal direction.

A front end portion of a cab-under-frame fixed to the outer surface of the floor panel is extended toward a front upper side, and a cab mount bracket is also extended toward a front upper side so that they are integrally joined with a front mounting rail. As a result, these three components are firmly fastened to disperse the incoming force in the longitudinal direction.

2 Claims, 11 Drawing Sheets

CENTER OF CAB TILT SHAFT

JOINT STRUCTURE OF CAB MOUNTING PORTION

BACKGROUND OF THE INVENTION

1. Field of the Invention

The present invention relates to a joint structure of a cab mounting portion for joining a cab of a forward control vehicle to a chassis frame.

2. Description of the Related Art

Figure 13:
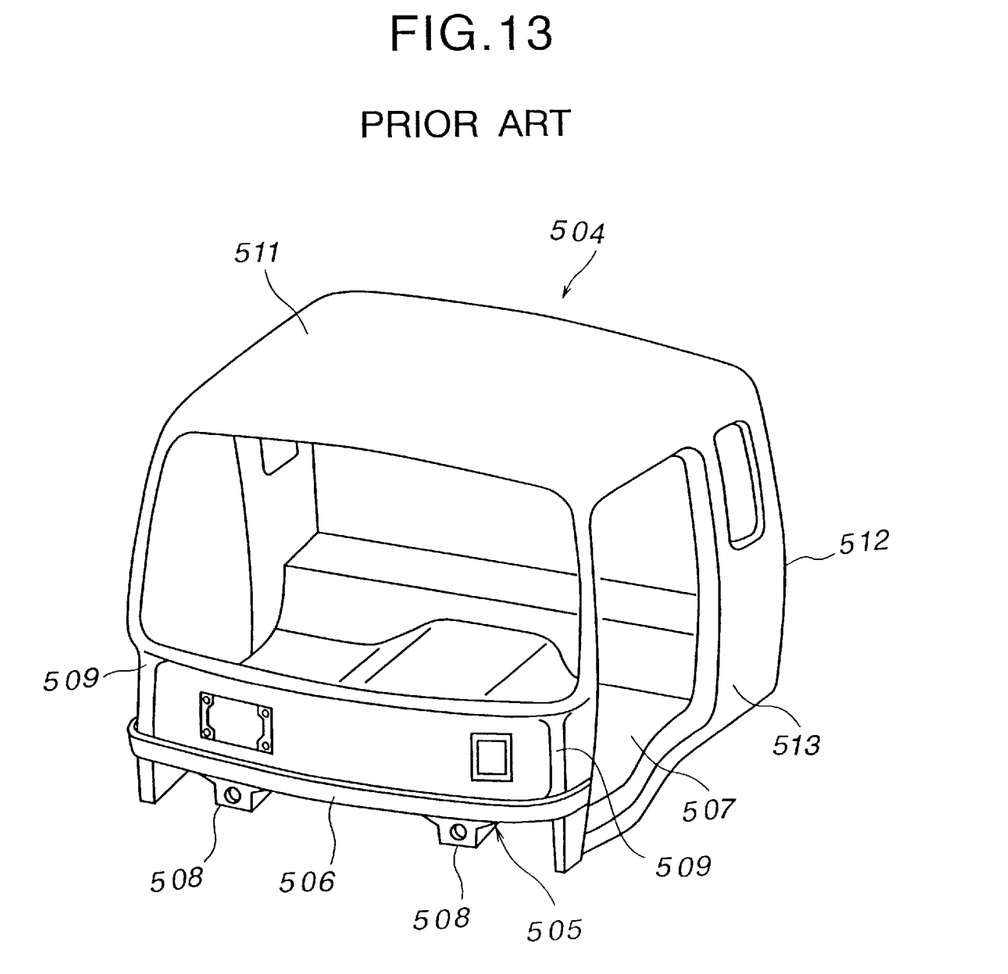
FIG. 13 is a perspective view showing a cab structure of a general forward control vehicle.

As a cab structure of a forward control vehicle, one shown in FIG. 13 is generally adopted. A cab 504 is surrounded by front pillars 509 provided on both right and left sides of a front portion, a front mounting rail 506 provided on an outer surface of the front lower portion, a roof panel 511, a rear panel 512, a side panel 513 and others, and a floor panel 507 is provided on a floor face. Further, cab-under-frames 508 are fixed to the outer surface of the floor panel 507. The cab of the forward control vehicle is coupled to a cab mount bracket which is rotatably provided on a chassis frame in a cab mounting portion.

Figure 14:
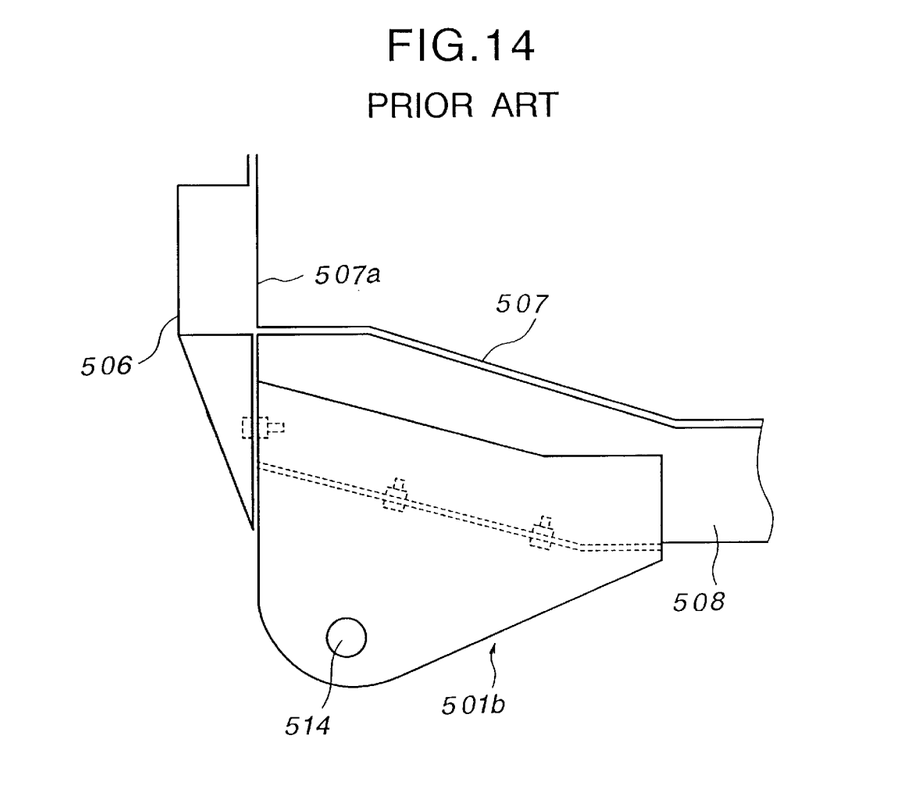
FIG. 14 shows an example of the structure of a joint portion for a cab and a chassis frame in a prior art.
Figure 15:
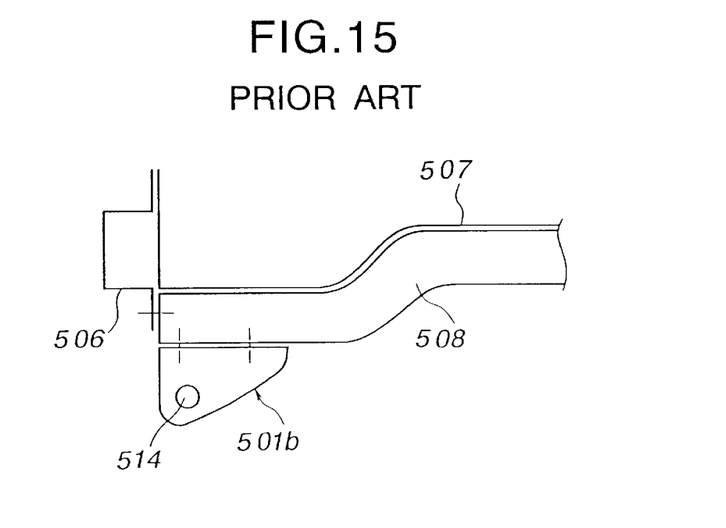
FIG. 15 shows the example of the structure of the joint portion for the cab and the chassis frame in the prior art.

FIGS. 14 and 15 show an example of the structure of a joint portion for the cab and the chassis frame in the prior art. A cab mount bracket 501b has a shape allowing contact with a lower surface or a side surface of the cab-under-frame 508 and a rotation center hole 514 for tilt of the cab 504 is formed thereto. Further, as shown in the drawings, the cab-under-frame 508 is fixed to an outer surface of the floor panel 507, and a front end portion of the cab-under-frame 508 is coupled to the front mounting rail 506 side.

In the above-described structure of the joint portion for the cab and the chassis frame, the cab 504 is supported by fastening the cab-under-frame 508 to the cab mount bracket 501b fixed to the chassis frame, and it is configured so as to sufficiently resist vertical external force applied from a road surface side during normal running. However, when a vehicle clashed head-on or bumped from behind, an impact load larger than that obtained during normal running acts in the longitudinal direction. Thus, in the structure of the conventional joint portion for the cab and the chassis frame, since the cab-under-frame 508 and the cab mount bracket 501b are fastened mainly in the vertical direction there is a possibility that the structure can not sufficiently resist the impact load in the longitudinal direction.

On the other hand, as an example of a well-known technique concerning the periphery of the cab mounting member, there are Japanese Utility Model Applications Laid-open Nos. 116277/1981 and 171653/1986. "The floor structure of a tilt cab" in Japanese Utility Model Application Laid-open No. 116277/1981 is a floor constituent member of a tilt cab, in which a front end of a main sill is flange-coupled to a convex shoulder surface of a front cross member constituting the convex shoulder surface on a rear surface side, and a front end of a cab hinge bracket fixed to the main sill is fixed to the convex shoulder surface. In the case of this well-known technique, the rigidity of the coupling portion is insufficient and the coupling rigidity of the cab hinge bracket relative to the main sill is insufficient because the cab hinge bracket is coupled to the convex shoulder surface on the rear surface of the front cross member having the front-open-section. Therefore, the strength against the external force in the longitudinal direction may be possibly insufficient. On the other hand, in "the cab structure of an automobile" disclosed in Japanese Utility Model Application Laid-open No. 171653/1986, a grill bracket is attached to a front surface of a floor frame which supports a outer surface of a floor panel and to which a cab mounting bracket is fixed, and the grill bracket is fixed to the front grill so that the front grill can function as a strength member. However, this structure cannot sufficiently resist the impact load in the longitudinal direction.

SUMMARY OF THE INVENTION

In view of the above-described problems, it is an object of the present invention to provide a cab structure that a joint portion for a cab and a chassis frame has the sufficient shear strength and which can disperse external force across the cab or the chassis frame to reduce the burden of load and which can sufficiently resist an impact load in the longitudinal direction.

To achieve this aim, there is provided a cab mounting portion structure in which a "inside surface portion of a front mounting rail" provided on a cab front lower side is coupled to a "front end portion upwardly extending a cab-under-frame" fixed to a floor outer surface, a cab mount bracket is also extended upwardly to be coupled to a vehicle front outer portion of the coupling portion, and these three members are integrally fixed to improve the joint strength.

BRIEF DESCRIPTION OF THE DRAWINGS

FIG. 11 is a perspective view showing the state in which the upward portion 8b at an end of the cab-under-frame 8 is engaged with the cab mount bracket 1a;

DETAILED DESCRIPTION OF THE PREFERRED EMBODIMENTS

Figure 1:
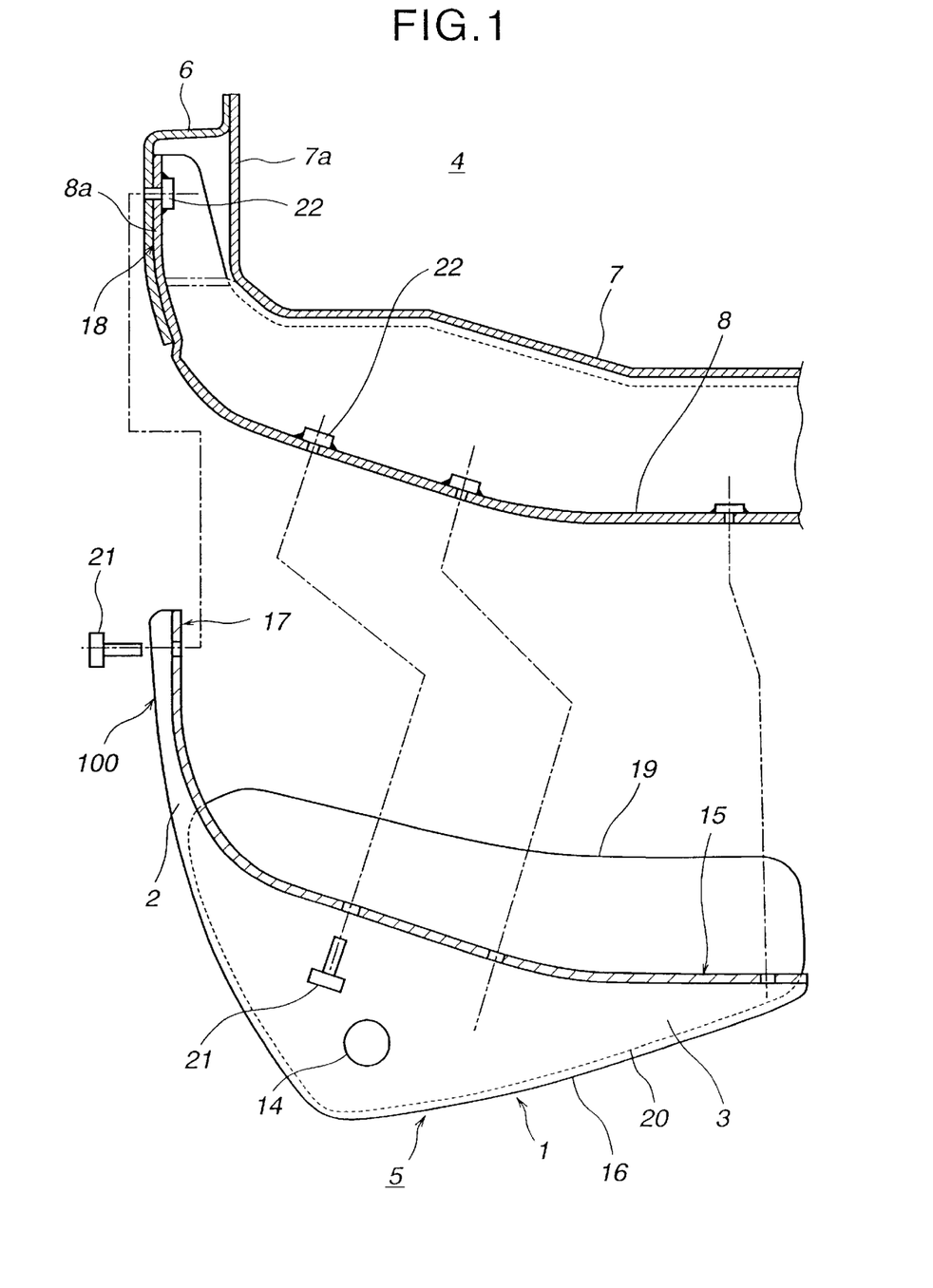
FIG. 1 is a cross sectional view vertical to a horizontal plane, showing main members of a joint portion 5 for a cab and a chassis frame in an embodiment according to the present invention.
Figure 3:
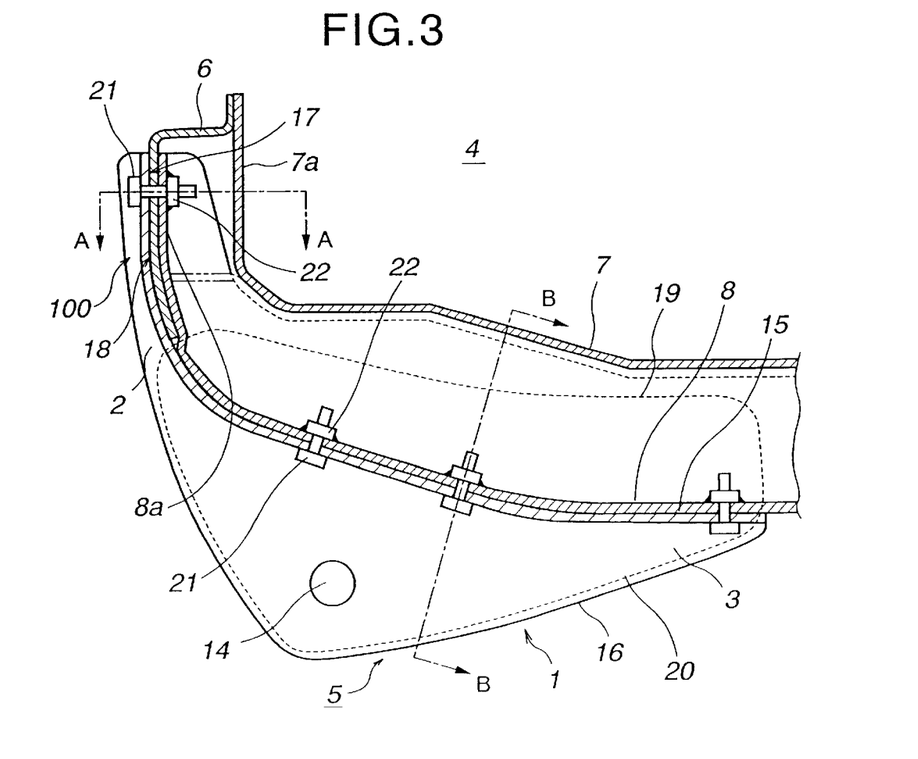
FIG. 3 is a cross sectional view vertical to a horizontal plane, showing that a cab-under-frame 8 and the cab mount bracket 1 in FIG. 1 are fastened to constitute the joint portion 5 for the cab and the chassis frame.
Figure 4A:
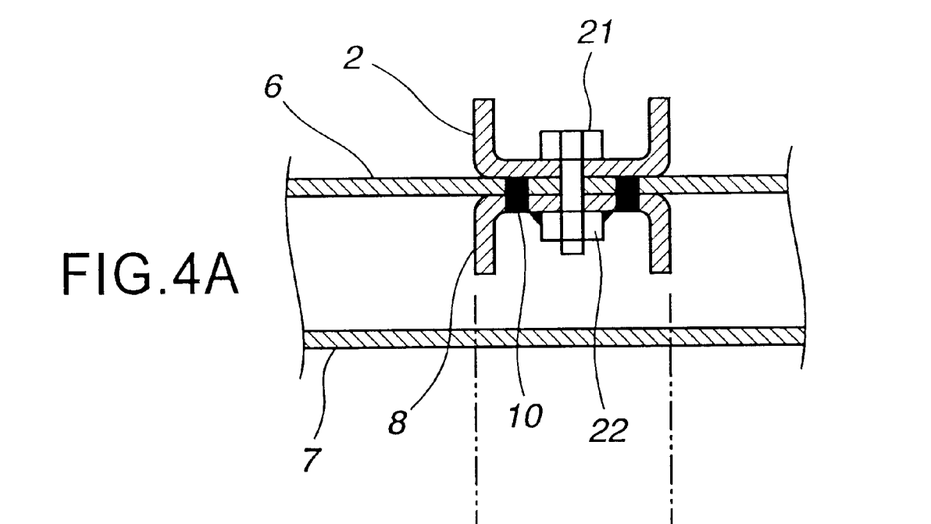
FIGS. 4 and 4B are cross sectional views taken along the line A—A and the line B—B in FIG. 3.
Figure 4B:
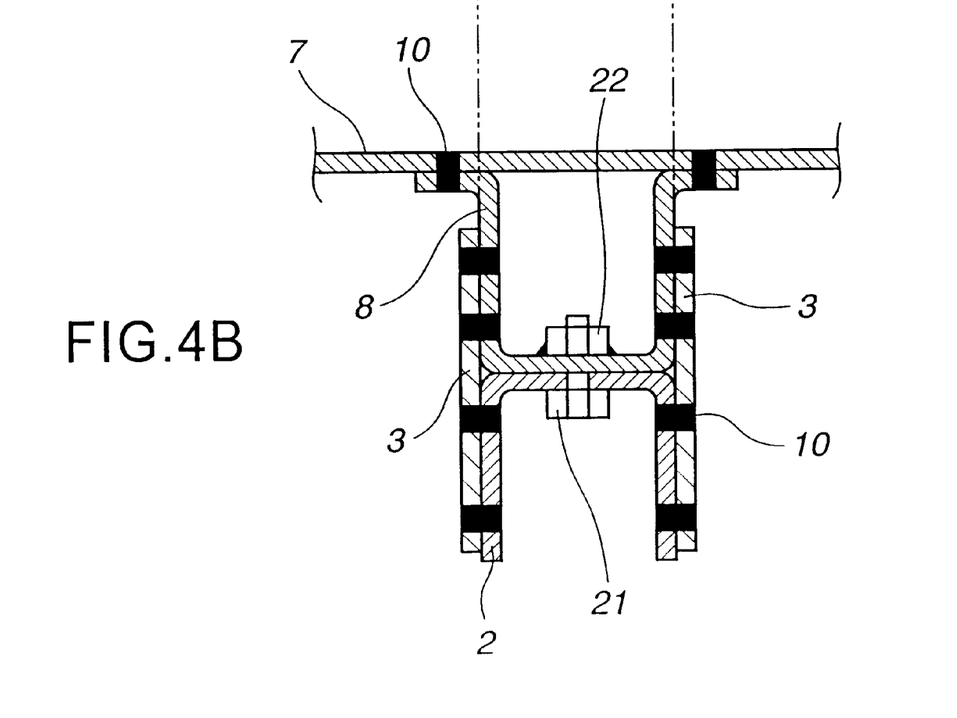
Figure 5:
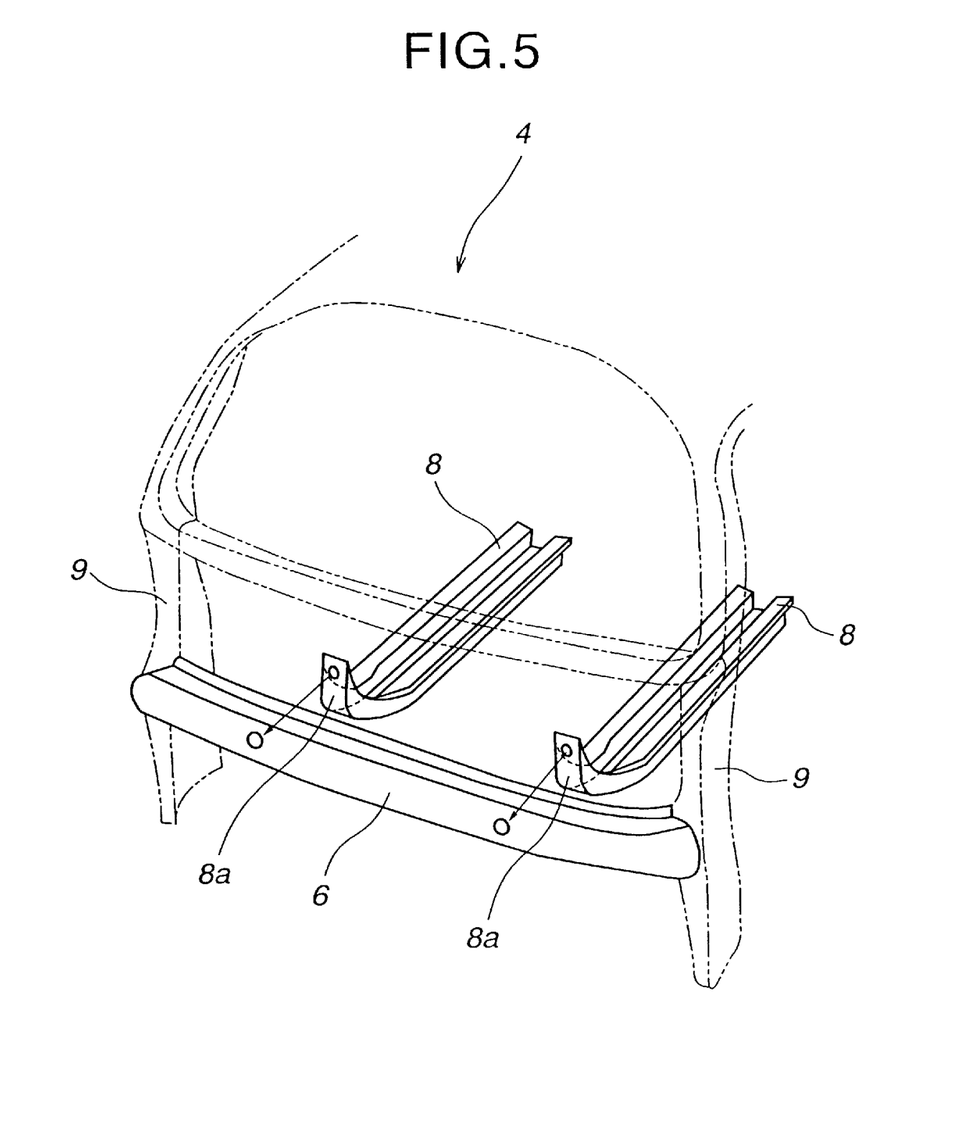
FIG. 5 is a perspective view showing the component relationship between front pillars 9, a front mounting rail 6 and the cab-under-frame 8.

FIGS. 1 to 8 show an embodiment of the present invention. FIG. 1 is a longitudinal cross section view vertical to a horizontal plane, showing main members of a joint portion 5 for a cab and a chassis frame. As shown in 5 FIG. 1, a front mounting rail 6 having a hat-like cross section is provided on the front lower side of a cab 4 (FIG. 5). A front end 7a of a floor panel 7 forming a floor face of the cab 4 uprises to close an opening portion of the front mounting rail 6 and is fixed. On the other hand, a cab-under-frame 8 is brought into contact with the outer surface of the floor panel 7 to be fixed, and an upward portion 8a which extends toward the front upper portion of the cab is formed to the front end of the cab-under-frame 8 and fixed to a front vertical surface 18 of the front mounting rail 6. FIG. 5 is a perspective view showing the component relationship between front pillars 9, the front mounting rail 6 and the cab-under-frame 8.

Figure 2:
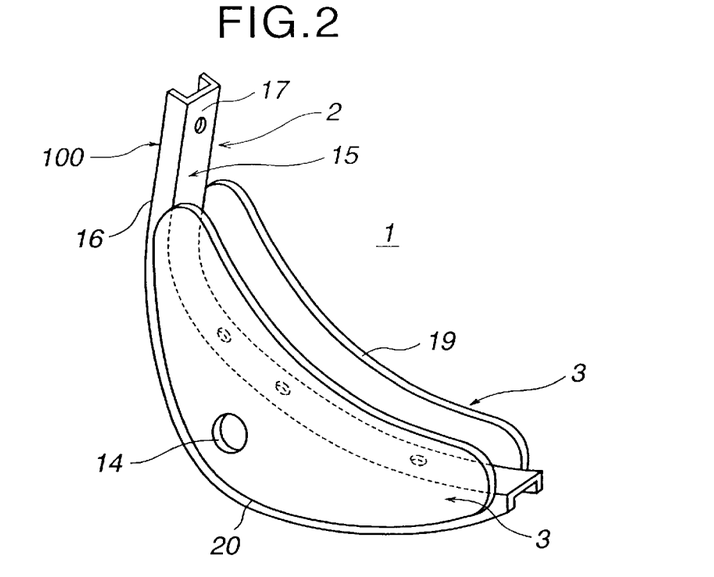
FIG. 2 is a perspective view of a cab mount bracket 1.

A cab mounting bracket 1 configuring one of constituent parts of the joint portion 5 for the cab and the chassis frame is made up of a bracket bend 2 and a bracket plate 3. FIG. 2 is a perspective view of the cab mount bracket 1, and FIG. 3 is a longitudinal cross section view vertical to a horizontal plane showing that the cab-under-frame 8 and the cab mount bracket 1 in FIG. 1 are fastened to constitute the joint portion 5 for the cab and the chassis frame. FIG. 4A is a cross sectional view taken along the line A—A in FIG. 3, and FIG. 4B is a cross sectional view taken along the line B—B in FIG. 3. As shown in FIG. 2, the racket bend 2 is composed of an upper surface portion 15 which has a substantially-C-like cross section and forms a profile matching with a curved surface of an outer surface of the cab-under-frame 8, and a profile portion 16 which forms a largest cross section at a substantially central part by curving the substantially-C-like cross section from the front end toward the rear end. A flat portion 17 is formed on the front end side of the upper surface portion 15, and this flat portion 17 comes into contact with the front vertical surface 18 of the front mounting rail 6 as shown in FIG. 3. The flat portion 17 and the vicinity thereof form together with a part of the profile portion 16 an upward portion 100 which extends toward the front upper part of the cab along the cab-under-frame 8.

Figure 6:
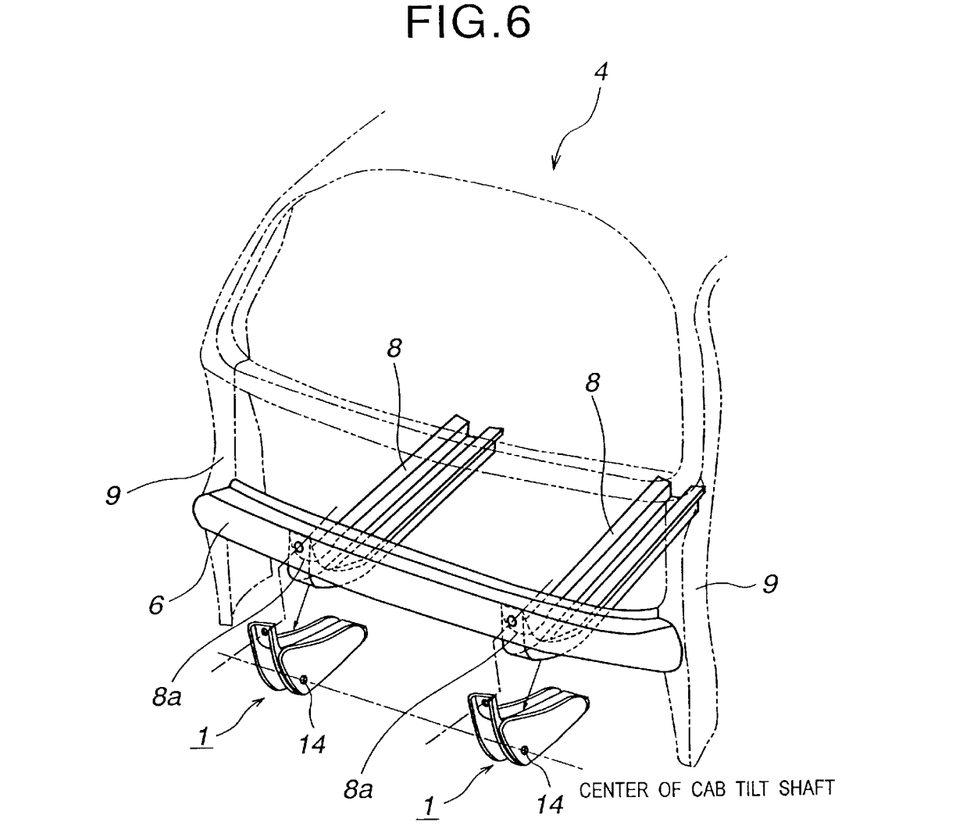
FIG. 6 is a perspective view showing the state in which an upward portion 8a at an end of the cab-under-frame 8 is engaged with a cab mount bracket 1.
Figure 7:
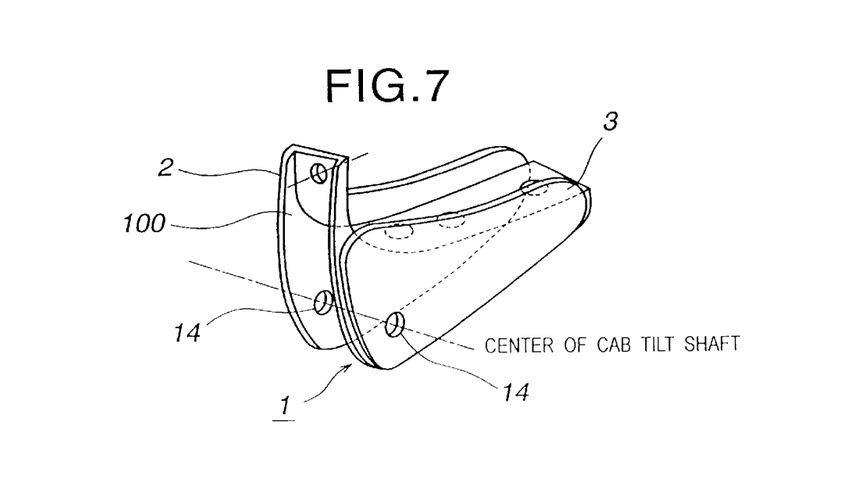
FIG. 7 is an enlarged perspective view of the cab mount bracket 1 depicted in FIG. 6.
Figure 8:
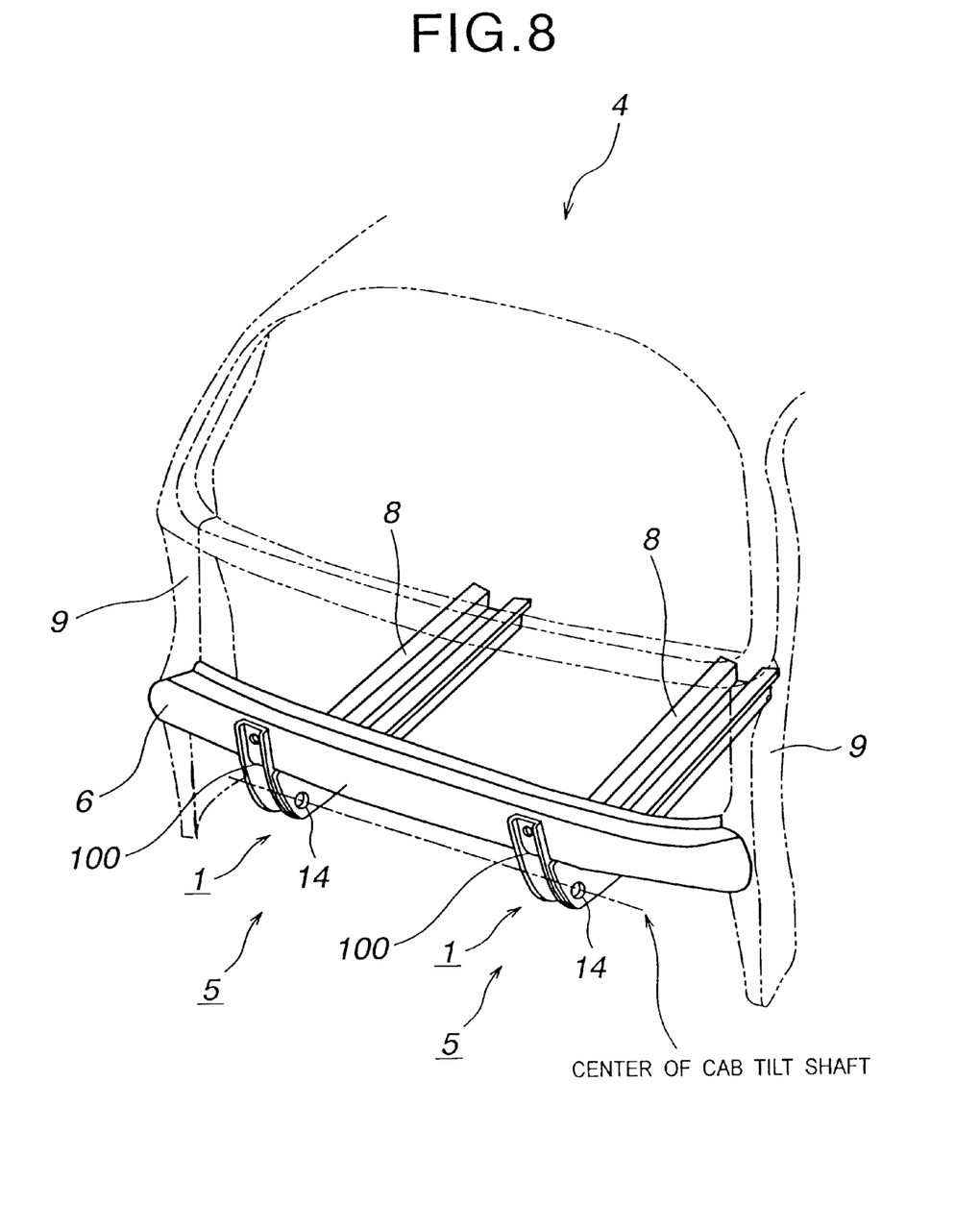
FIG. 8 is a perspective view showing the state in which constituent members of the joint portion 5 for the cab and the chassis frame are assembled as a whole.

On the other hand, the bracket plate 3 is formed by a tabular member as shown in FIGS. 1, 2 and 3. In this example, the bracket plate 3 is fixed to each of the both side surfaces of the bracket bend 2 in the state that a curved profile portion 20 is substantially matched with the profile portion 16 of the bracket bend 2. In this state, a curved portion 19 of the bracket plate 3 is formed so as to largely protrude from the upper surface portion 15 of the bracket bend 2. This protruding portion is fixed on the side surface of the cab-under-frame 8 by spot welding or arc welding. As shown in FIGS. 1, 2 and 3, a tilt shaft hole 14 is provided to the cab mount bracket 1, and this hole serves as a bearing portion engaged with a tilt shaft for tilting the cab 4 and simultaneously bearing the load applied to the cab 4. FIG. 6 is a perspective view showing the state in which the upward portion 8a at the end of the cab-under-frame 8 is engaged with the cab mount bracket 1, and FIG. 7 is an enlarged perspective view showing the cab mount bracket 1 illustrated in FIG. 6. FIG. 8 is a perspective view showing that constituent parts of the joint portion 5 for the cab and the chassis frame are assembled as a whole. The upward portion 100 of the cab mount bracket 1 is exposed on the outer surface of the front mounting rail 6.

The bracket bend 2 is provided in such a manner that the upper surface portion 15 is brought into contact with the outer surface of the cab-under-frame 8 and the flat portion 17 on the front end side thereof is brought into contact with the front surface 18 of the front mounting rail 6. The bracket bend 2 is coupled and fixed to these portions by mechanical fastening using a bolt 21 and a nut 22 (FIGS. 1, 3 and 4) or spot welding or arc welding. In this state, the bracket plate 3 is fixed on each of the both side surfaces of the cab-under-frame 8 by spot welding or arc welding as illustrated by a welding portion 10 in FIG. 4B. As described above, the cab mount bracket 1 is stiffly coupled to the front mounting rail 6 and the cab-under-frame 8, and the entire rigidity of the periphery of these members becomes much higher than that of the prior art structure.

On the other hand, as shown in FIG. 8, the front mounting rail 6 to which the cab-under-frame 8 or the cab mount bracket 1 according to the present invention is fixed is coupled with the front pillars 9 and 9 at the both ends thereof. Therefore, when external force acts on the cab 4 having the above-described structure in the longitudinal direction, a part of this external force acts on the front surface of the front mounting rail 6. However, the periphery of the front mounting rail 6 is formed so as to have the high rigidity as described above, and the surrounding constituent parts accepts the external force as a whole. Therefore, shear force and the like applied to the individual constituent parts can be greatly reduced. Further, the external force which has acted on the front mounting rail 6 side is transmitted to the entire cab 4 through the front pillars 9 and 9, and the external force is dispersed. Thus, the influence of the external force can be greatly reduced, and it is possible to sufficiently resist the large impact load.

Figure 9:
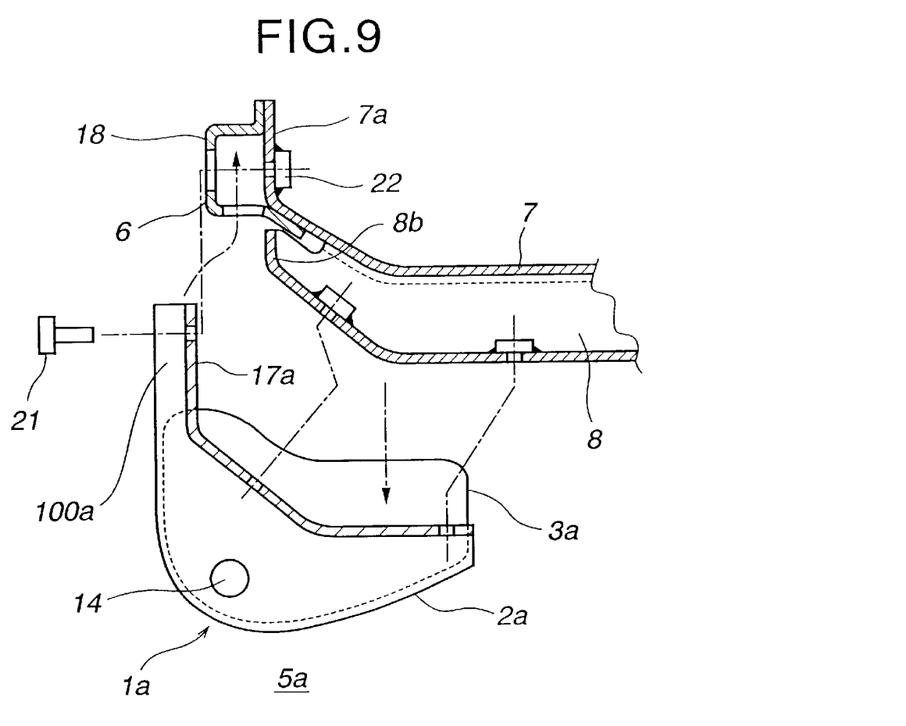
FIG. 9 is a longitudinal cross section view vertical to a horizontal plane, showing main members of the joint portion 5a for the cab and the chassis frame in another embodiment according to the present invention.
Figure 10:
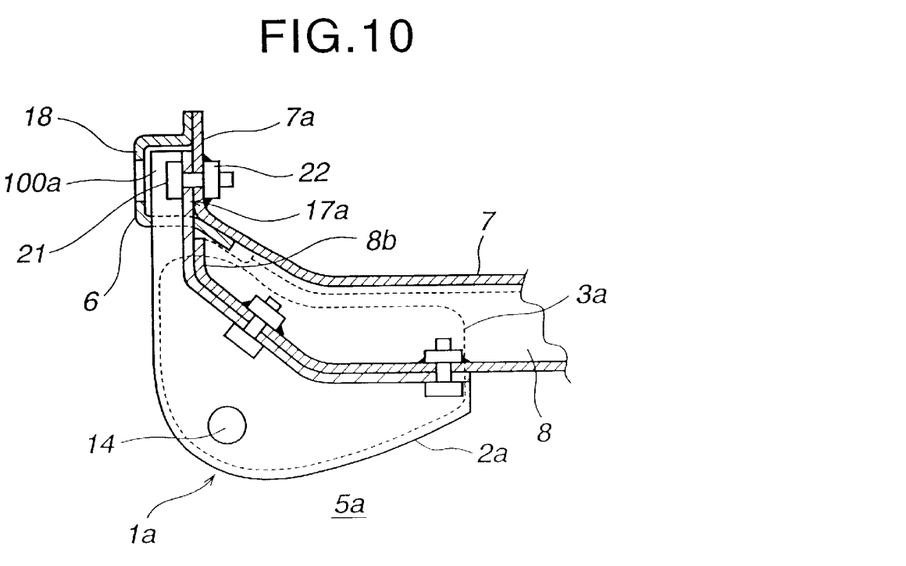
FIG. 10 is a longitudinal cross section view vertical to a horizontal plane, showing that the cab-under-frame 8 and the cab mount bracket 1a in FIG. 9 are fastened to constitute the joint portion 5a for the cab and the chassis frame.

FIGS. 9 to 12 show another embodiment according to the present invention. FIG. 9 is a longitudinal cross section view vertical to a horizontal plane, showing main members of the joint portion 5a for the cab and the chassis frame. FIG. 10 is a longitudinal cross section view vertical to a horizontal plane, showing that the cab-under-frame 8 and the cab mount bracket 1a depicted in FIG. 9 are fastened to constitute the joint portion 5a for the cab and the chassis frame. The structure of the cab mount bracket 1a, the bracket bend 2a and the bracket plate 3a has the structural influence which is similar to that of the cab mount bracket 1 and others in the above-described embodiment. In the above-mentioned embodiment, the upward portion 100 of the cab mount bracket 1 is coupled by bringing the flat portion 17 of the bracket bend 2 into contact with the front vertical surface 18 of the front mounting rail 6. However, in the present embodiment, as shown in FIGS. 9 and 10, the upward portion 100a of the cab mount bracket 1a is inserted into the inner side of the front mounting rail 6, and the flat portion 17a is brought into contact with and fixed to the front end 7a of the floor panel 7. The front end portion of the cab-under-frame 8 constitutes the upward portion 8b and does not extend to a position at which it is directly joined with the front mounting rail 6. However, when the upward portion 8b is abut on the cab mount bracket 1a to be fastened and it is then fixed with the cab mount bracket 1a through the bracket plate 3a by welding and the like, the high strength of the joint portion 5a for the cab and the chassis frame can be assured.

Figure 11:
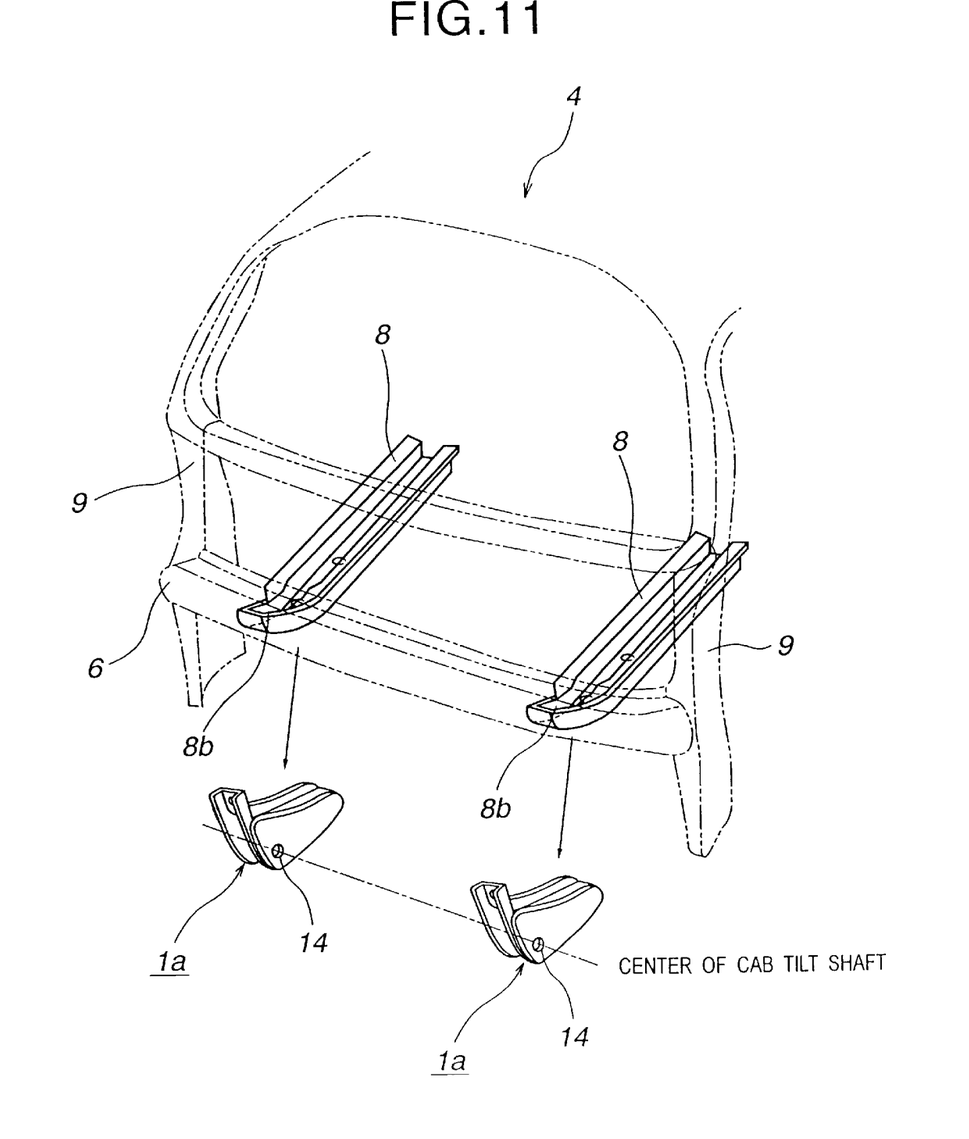
Figure 12:
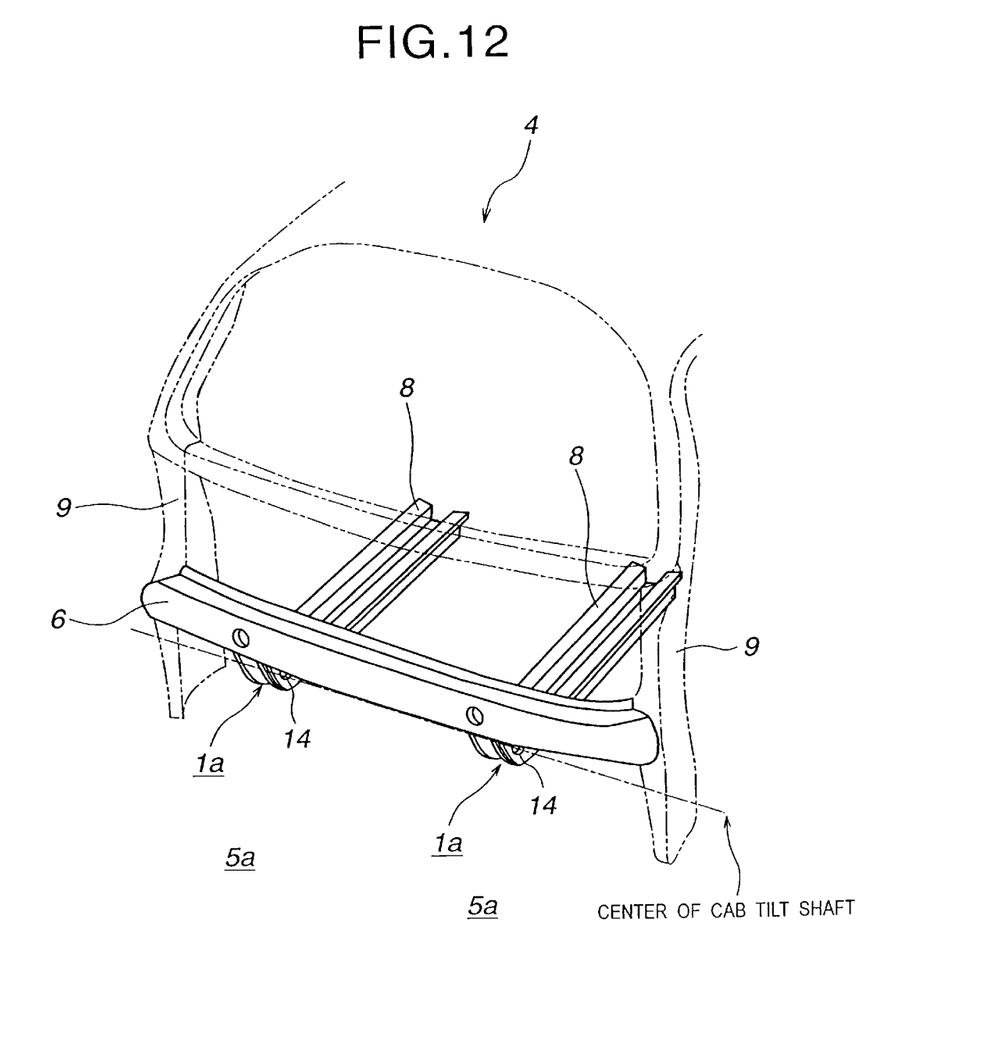
FIG. 12 is a perspective view showing the state in which constituent members of the joint portion 5a for the cab and the chassis frame are assembled as a whole.

FIG. 11 shows the state where the upward portion 8b at the end of the cab-under-frame 8 is engaged with the cab mount bracket 1a. FIG. 12 is a perspective view in which the constituent parts of the joint portion 5a for the cab and the chassis frame are assembled as a whole. The front end portion of the cab mount bracket 1*a* is hidden inside without being exposed on the outer surface of the front mounting rail 6.

When the external force in the longitudinal direction acts on the cab 4 having the above-described structure, this external force partially acts on the front surface of the floor panel 7. However, the floor panel 7 is reinforced by the front mounting rail 6 to be formed with the high rigidity, and the entire surrounding constituent members accept the external force. Therefore, as similar to the above-described embodiment, the shear force and the like applied to the individual constituent elements is dispersed and greatly reduced. Further, the external force which has acted from the floor panel 7 through the front mounting rail 6 is transmitted to the entire cab 4 through the front pillars 9 and 9. Therefore, the entire vehicle bears the external force, and the influence of the external force can be greatly reduced to sufficiently resist the large impact load.

The rigidity of the joint portion for the cab and the chassis frame can be greatly improved, and the external force in the longitudinal direction can be entirely transmitted to the cab and the chassis frame. Further, the influence of the external force can be largely reduced, and it is possible to sufficiently resist the impact load. Moreover, displacement of the cab can be reduced, and an accommodation space can be assured.

What is claimed is:

1. Joint structure of a cab mounting portion provided at a front lower portion of said cab for joining said cab with a chassis frame, comprising said structure integrally fixing a front mounting rail which is horizontally provided at said cab front lower portion and is fixed to front pillars on both sides of said cab, a cab-under-frame which is fixed to a floor panel outer surface and forms an upward portion extending toward a cab front upper portion, and a cab mount bracket which is fixed to said cab-under-frame and forms and upward portion extending toward said cab front upper portion along said cab-under-frame, wherein said cab-under-frame and said cab mount bracket are fixed to a front vertical surface of said front mounting rail.

2. Joint structure of a cab mounting portion provided at a front lower portion of said cab for joining said cab with a chassis frame comprising said structure integrally fixing a front mounting rail which is horizontally provided at said cab front lower portion and is fixed to front pillars on both sides of said cab, a cab-under-frame which is fixed to a floor panel outer surface and forms an upward portion extending toward a cab front upper portion, and a cab mount bracket which is fixed to said cab-under-frame and forms and upward portion extending toward said cab front upper portion along said cab-under-frame, wherein said upward portion of said cab mount bracket extending to the vicinity of an upper surface of said front mounting rail is fixed to an outer surface of said floor panel in said front mounting rail.

* * * * *